United States Patent
Cabral et al.

(10) Patent No.: US 10,460,521 B2
(45) Date of Patent: Oct. 29, 2019

(54) TRANSITION BETWEEN BINOCULAR AND MONOCULAR VIEWS

(71) Applicant: Facebook, Inc., Menlo Park, CA (US)

(72) Inventors: Brian Keith Cabral, San Jose, CA (US); Forrest Samuel Briggs, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 13 days.

(21) Appl. No.: 15/900,970

(22) Filed: Feb. 21, 2018

(65) Prior Publication Data
US 2018/0182175 A1 Jun. 28, 2018

Related U.S. Application Data

(63) Continuation of application No. 15/096,162, filed on Apr. 11, 2016, now Pat. No. 9,934,615.
(Continued)

(51) Int. Cl.
*G06T 19/00* (2011.01)
*G06T 5/50* (2006.01)
(Continued)

(52) U.S. Cl.
CPC ............ *G06T 19/006* (2013.01); *G06K 9/209* (2013.01); *G06K 9/342* (2013.01); *G06T 3/0093* (2013.01); *G06T 3/4038* (2013.01); *G06T 5/50* (2013.01); *G06T 15/40* (2013.01); *H04N 5/23238* (2013.01); *H04N 13/111* (2018.05);
(Continued)

(58) Field of Classification Search
None
See application file for complete search history.

(56) References Cited

U.S. PATENT DOCUMENTS

5,703,961 A 12/1997 Rogina et al.
5,760,826 A 6/1998 Nayar
(Continued)

FOREIGN PATENT DOCUMENTS

WO WO 2015/142174 A1 9/2015

OTHER PUBLICATIONS

PCT International Search Report and Written Opinion, PCT Application No. PCT/US2017/026244, dated Jun. 16, 2017, 15 pages.
(Continued)

*Primary Examiner* — Jason A Pringle-Parker
(74) *Attorney, Agent, or Firm* — Fenwick & West LLP

(57) ABSTRACT

An image processing system is designed to generate a canvas view that transitions between binocular views and monocular views. Initially, the image processing system receives top/bottom images and side images of a scene and calculates offsets to generate synthetic side images for left and right view of a user. To transition between binocular views and monocular views, the image processing system first warps top/bottom images onto corresponding synthetic side images to generate warped top/bottom images, which realizes the transition in terms of shape. The image processing system then morphs the warped top/bottom images onto the corresponding synthetic side images to generate blended images for left and right eye views with the blended images. The image processing system creates the canvas view which transitions between binocular views and monocular views in terms of image shape and color based on the blended images.

16 Claims, 10 Drawing Sheets

Related U.S. Application Data

(60) Provisional application No. 62/319,208, filed on Apr. 6, 2016.

(51) Int. Cl.

| | | |
|---|---|---|
| *G06T 15/40* | (2011.01) | |
| *G06K 9/20* | (2006.01) | |
| *G06K 9/34* | (2006.01) | |
| *G06T 3/00* | (2006.01) | |
| *G06T 3/40* | (2006.01) | |
| *H04N 13/243* | (2018.01) | |
| *H04N 13/111* | (2018.01) | |
| *H04N 5/232* | (2006.01) | |
| *H04N 13/00* | (2018.01) | |

(52) U.S. Cl.
CPC ... *H04N 13/243* (2018.05); *G06K 2009/2045* (2013.01); *G06T 2207/20221* (2013.01); *G06T 2207/20228* (2013.01); *G06T 2219/028* (2013.01); *H04N 2013/0088* (2013.01)

(56) References Cited

U.S. PATENT DOCUMENTS

| | | |
|---|---|---|
| 6,269,175 B1 | 7/2001 | Hanna et al. |
| 6,778,207 B1 | 8/2004 | Lee et al. |
| 9,560,345 B2 | 1/2017 | Grundhofer |
| 9,934,615 B2 | 4/2018 | Cabral et al. |
| 10,057,562 B2 | 8/2018 | Cabral et al. |
| D830,444 S | 10/2018 | Cabral et al. |
| D830,445 S | 10/2018 | Cabral et al. |
| 2002/0113791 A1 | 8/2002 | Li et al. |
| 2003/0117488 A1 | 6/2003 | Pierce et al. |
| 2006/0125921 A1 | 6/2006 | Foote |
| 2008/0226123 A1 | 9/2008 | Birtwistle et al. |
| 2009/0051624 A1 | 2/2009 | Finney et al. |
| 2009/0129630 A1 | 5/2009 | Gloudemans et al. |
| 2009/0153549 A1 | 6/2009 | Lynch et al. |
| 2010/0076306 A1 | 3/2010 | Daigneault et al. |
| 2010/0085425 A1 | 4/2010 | Tan |
| 2011/0157305 A1 | 6/2011 | Kosakai et al. |
| 2011/0211046 A1 | 9/2011 | Stumber et al. |
| 2012/0155786 A1 | 6/2012 | Zargarpour et al. |
| 2013/0185353 A1 | 7/2013 | Alface et al. |
| 2014/0104378 A1 | 4/2014 | Kauff et al. |
| 2014/0132706 A1 | 5/2014 | Kira et al. |
| 2014/0146132 A1 | 5/2014 | Bagnato et al. |
| 2014/0153916 A1 | 6/2014 | Kintner |
| 2014/0228118 A1 | 8/2014 | Hardy |
| 2014/0320668 A1 | 10/2014 | Kalevo et al. |
| 2015/0193920 A1 | 7/2015 | Knee et al. |
| 2015/0341618 A1 | 11/2015 | He et al. |
| 2015/0346471 A1 | 12/2015 | Schwarz et al. |
| 2015/0350542 A1 | 12/2015 | Steuart, III |
| 2016/0037030 A1 | 2/2016 | Weissig et al. |
| 2016/0088280 A1 | 3/2016 | Sadi et al. |
| 2016/0191815 A1 | 6/2016 | Annau et al. |
| 2016/0212409 A1 | 7/2016 | Cole et al. |
| 2016/0253810 A1 | 9/2016 | Cole et al. |
| 2016/0255322 A1 | 9/2016 | Kerofsky et al. |
| 2016/0314622 A1 | 10/2016 | Davis et al. |
| 2016/0353090 A1 | 12/2016 | Esteban et al. |
| 2016/0353146 A1 | 12/2016 | Weaver et al. |
| 2016/0379415 A1 | 12/2016 | Espeset et al. |
| 2017/0069097 A1 | 3/2017 | Molgaard et al. |
| 2017/0076429 A1 | 3/2017 | Russell |
| 2017/0163967 A1 | 6/2017 | Maier |

OTHER PUBLICATIONS

United States Office Action, U.S. Appl. No. 15/096,162, dated Jul. 10, 2017, nine pages.

U.S. Office Action, U.S. Appl. No. 15/096,157, dated Jul. 27, 2018, twelve pages.

European Patent Office, Extended European Search Report and Opinion, European Patent Application No. 17779789, dated Jul. 19, 2019, eleven pages.

TRANSITION BETWEEN BINOCULAR AND MONOCULAR VIEWS

CROSS-REFERENCE TO RELATED APPLICATION(S)

This application is a continuation of U.S. application Ser. No. 15/096,162, filed Apr. 11, 2016, which claims the benefit of U.S. Provisional Application No. 62/319,208, titled "Transition between binocular and monocular views" and filed Apr. 6, 2016, which is incorporated by reference in its entirety.

BACKGROUND

This disclosure relates generally to a vision system, and more specifically to an image processing system that realizes smooth transition between binocular and monocular views.

Virtual Reality (VR) is becoming increasingly popular and a multi-camera system is often used in a VR system to capture images and/or videos to create virtual scenes for a user experiencing the VR system. Images captured by different cameras may be combined to create canvas views used to provide virtual scenes for a user to experience the VR effect. However, problems may arise when combining images captured by different cameras to create synthetic images. As one example, roughly blending images of a same object taken by different cameras may cause double vision in the combined image. Additionally, when creating a canvas view to simulate the view for a user to look up and down, the transition between binocular views and monocular views may be jerky or provide seams between the top and side cameras of the binocular views, which causes distortion in the created view and degrades user experience with the VR system.

Thus, there is a need for smooth transition between binocular and monocular views.

SUMMARY

An image processing system creates canvas views with a smooth transition between binocular views and monocular views via image blending.

The image processing system receives images of a scene including an object, the images of which are captured by a camera rig system. The images captured include top/bottom images taken by top/bottom axis cameras and side images taken by peripheral cameras included in the camera rig system. The image processing system also creates synthetic images from the side images to simulate a view from the location of a synthetic camera between one or more of the peripheral cameras. The synthetic images reflect synthetic views which simulate the left/right views of a user when the sightlines of the user's eyes are directed to the object. Multiple synthetic views may be generated, for example to simulate a view for a left and a right eye of a user, and thereby provide a binocular vision.

After the synthetic images are created, the image processing system executes image blending for a smooth transition between binocular views (where each eye differs) and monocular views (where each eye is the same). For portions of a canvas view at an angle higher than the field of view of the peripheral cameras, the top or bottom camera is used, which may provide the same image for both eyes and thereby monocular vision. To smooth the transition between monocular and binocular vision, the top/bottom images are first warped onto the corresponding synthetic images to generate warped top/bottom images for smooth transition in terms of shape, and optical flow is used for the shape warping. The image processing system then morphs the warped top/bottom images onto the synthetic images to generate blended images for smooth transition in terms of color, and alpha blending is used for the color morphing. The image processing system applies the blending process described above to both left eye view and right eye view, which generates canvas views for both left and right eyes.

In some embodiments, the image processing system adjusts the location of the synthetic views as a function of a vertical angle, such that the two synthetic cameras for both eyes are located at a maximum interpupillary distance at a vertical angle level to the ground, and the distance between the two synthetic cameras is reduced as the vertical angle approaches the angle higher than the field of view of the peripheral cameras. The distance between the two synthetic cameras may be reduced by simulating a reduced interpupillary distance as a function of the vertical angle. In some embodiments, the interpupillary distance is zero when the vertical angle is higher than a threshold, which may correspond to the vertical angle higher than the field of view of the peripheral cameras. In this instance, the synthetic cameras may have the same location and view.

In some examples, a camera view may be occluded by an object, such as a support structure for the camera rig. The occlusion of the object is removed by merging a secondary camera view into a primary camera view. The primary camera view may include a view consistent with a view point of other cameras, but include the object occluding its view of a portion of the environment. A secondary camera is located on another side of the object, such that the secondary camera includes portions of the environment that are occluded by the object in the primary view. In the primary and the secondary view, a filter is applied to the portions of the view that include the occluding object. The filter may exclude or zero-out the alpha channel or pixel values for the pixels to which the filter applies. An optical flow is calculated from the secondary view to the primary view, and the secondary view is combined with the primary view using the optical flow. By having a secondary camera with a similar view of the environment as the primary camera and combining the resulting images, a combined view can be generated that creates the illusion of a single camera that captured the environment without occlusion.

The figures depict various embodiments of the present invention for purposes of illustration only. Once skilled in the art will readily recognize from the following discussion that alternative embodiments of the structures and methods illustrated herein may be employed without departing from the principles of the invention described herein.

DETAILED DESCRIPTION

System Architecture

Figure 1:
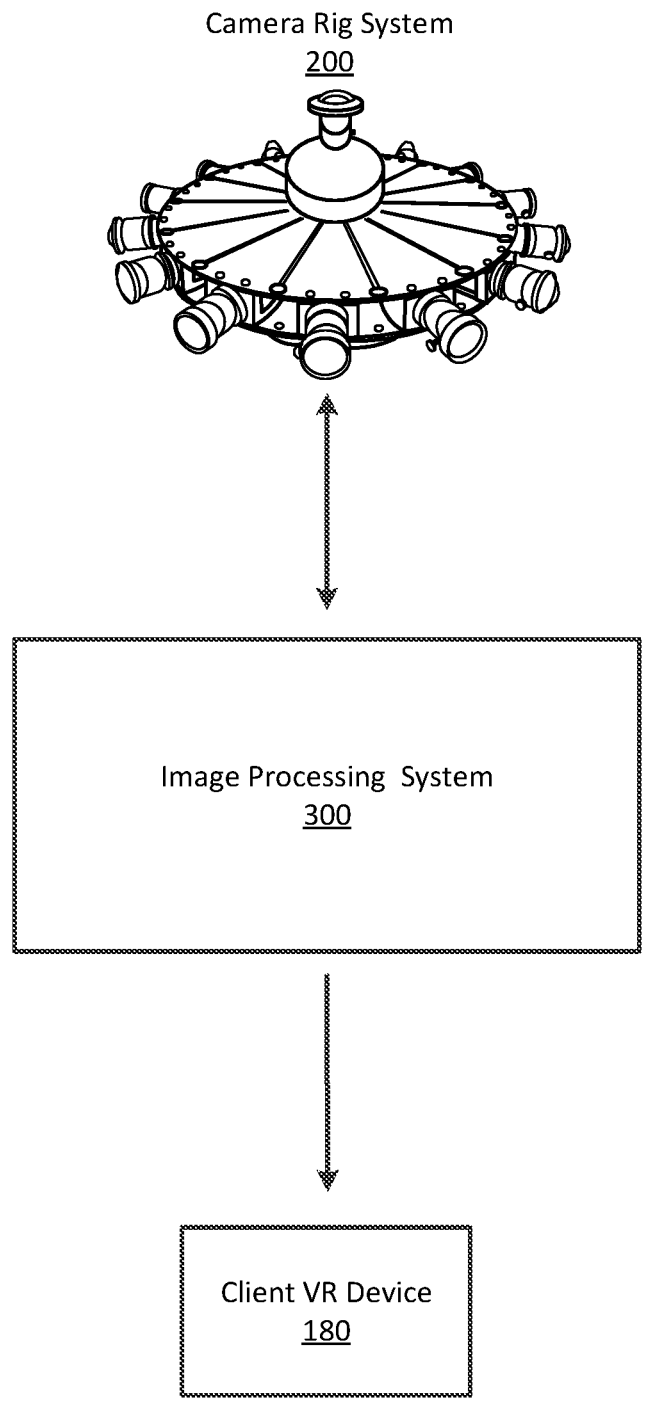
FIG. 1 is a block diagram of a system environment in which an image processing system operates, according to one embodiment

FIG. 1 shows a block diagram of a system environment 100 in which an image processing system 300 operates, according to one embodiment. The system environment 100 shown in FIG. 1 includes a camera rig system 200, an image processing system 300, and a client VR device 180. Only one camera rig system 200, one image processing system 300 and one client VR device 180 are shown in FIG. 1 for purpose of illustration. In alternative embodiments not shown, the system environment 100 can include multiple camera rig systems 200, image processing systems 300, client VR devices 180, and different and/or additional components. Likewise, the functions performed by various entities in the system environment 100 may differ in different embodiments.

The camera rig system 200 is a multi-camera system that is designed to capture images and/or videos of a local area or an object. The local area is the environment that surrounds the camera rig system 200. For example, the local area may be a room where the camera rig system 200 is positioned inside. The images captured by the camera rig system 200 may be multiple views of a scene or an object, which is used to create canvas views of a scene for a VR system and the created canvas views are provided to the client VR device 180. A canvas view refers to a view that combines views from the various cameras in the camera rig system 200, and can be any panoramic, spherical panoramic, or suitable wide angle view of a scene. More specifically, one canvas view is created for the left eye of a user and another canvas view is created for the right eye of the user. When the user wears the client VR device 180, the canvas views are used to generate a virtual reality scene to the user.

In some embodiments, the camera rig system 200 also captures images to simulate an experience for a user who wears a client VR device 180 of standing at the origin point of the camera rig system. As more fully described below in FIG. 2A-2B, the camera rig system 200 includes multiple peripheral cameras 230, a top axis camera 240A and a bottom axis camera 240B. In some embodiments, the images captured by the cameras included in the camera rig system 200 and related image data are output to an image processing system 300 for processing the images. As more fully described below, the peripheral cameras 230 capture side images of a scene, the top axis camera 240A captures a top image of the scene, and the bottom axis camera 240B captures a bottom image of the scene, and the captured images are provided to the image processing system 300 to generate a canvas view. The top/bottom images captured by the top/bottom axis cameras also represent top/bottom camera views. Since the top and bottom cameras may capture single images of the top of and bottom of the scene, the view for the top and the bottom may be monocular—that is, have the same images for both the left and right eye. The image processing system also generates synthetic images simulating the user's left and right view from the location where corresponding synthetic cameras should be located, as more fully described below. When the user looks in a direction viewed by the peripheral cameras, the peripheral cameras 230 may be used to generate different views for the left and right eye and thereby provide binocular vision that provides depth perception to the user of objects in the scene. To simulate a transition between monocular views and binocular views of a user when the user is looking up or down, the image processing system 300 blends the top image and bottom image to each of two synthetic images to simulate a left eye view and a right eye view of the user.

The image processing system 300 receives the captured images from the camera rig system 200 and generates a left view and a right view for a user wearing the client VR device 180. The generated left and right view provides a smooth transition between binocular views and monocular views when the user looks up or down. To generate the left and right views, after the side images taken by the peripheral cameras 230 are received, the image processing system 300 generates synthetic images for a left eye view and a right eye view. For example, for the left eye view, the synthetic side image is created for a corresponding synthetic camera representing the left eye's view. The top/bottom images taken by top/bottom axis cameras 240 are then blended to the synthetic images to realize smooth blending of shape and color of the top/bottom images and the synthetic images.

In contrast to real cameras such as peripheral cameras 230 and axis cameras 240, the synthetic cameras are virtual cameras located at the intersections between the camera rig perimeter 215 and the sightlines of the user when the user's left eye and right eye are looking at an object in the scene, as more fully described below in FIG. 4A-4B. In more detail, at least two synthetic cameras 430 are simulated, one to "generate" a synthetic image for the left eye, and the other to "generate" a synthetic side image for the right eye. In one embodiment, a synthetic image is created based on side images taken by corresponding peripheral cameras 230 and a position between the peripheral cameras for the synthetic camera that is calculated by the image processing system 300. In another embodiment, for the left or right eye view, a real peripheral camera 230 may capture an image from the position for the synthetic camera. In this case the image taken by the real peripheral camera is regarded a synthetic image for the eye.

The top/bottom images are blended to the generated synthetic images to smooth shape and color changes relative to the synthetic side images. As more fully described below, for each of the synthetic images corresponding to left eye view and right eye view, the image processing system 300 first warps top/bottom images onto the synthetic image to realize shape blending, and then morphs the warped top/bottom images to the synthetic image to realize color morphing. Each of these processes may be a function of the vertical angle of the image. I.e., the higher up in angle (for the top camera), the closer the resulting image is shaped and colored as the top camera view.

The blended images after shape warping via optical flow and color morphing via alpha blending may be used to create a canvas view. For example, the blended images for the left eye view are used to create the canvas view for the left eye of a user, and the blended images for the right eye view are used to create the canvas view for the right eye of the user. As more fully described below in FIG. 5, a canvas view includes a top-only part, a bottom-only part, a side-only part, an overlapped part between top view and side view, and an overlapped part between bottom view and side view. The top-only part refers to the part in a canvas view that is provided only by the top image, the bottom-only part refers to the part in a canvas view that is provided only by the bottom, and the overlapped part refers to the part in a canvas view that are shared and provided both by the top/bottom images and the side images. The blended images makes the overlapped part between the top/bottom view and the side view accurate and smooth without image problems such as double vision.

The client VR device 180 is a head-mounted display that presents media to a user. More specifically, the client VR device 180 receives images or video provided by the image processing system 300, and provides virtual scenes to the user wearing the client VR device. For example, the client VR device 180 provides the user with a stereoscopic 3D virtual scene generated by canvas views created by the image processing system 300. The client VR device 180 may also be interactive and show different images and/or videos in response to a user's action. For example, when the user's eyes rotate from one direction to another direction (e.g., from up to down) to look at different parts of the virtual scene, the client VR device 180 provides accurate images in response to the user's eyes' rotation, allowing the user to experience smooth transition of different parts of the virtual scene.

Figure 2A:
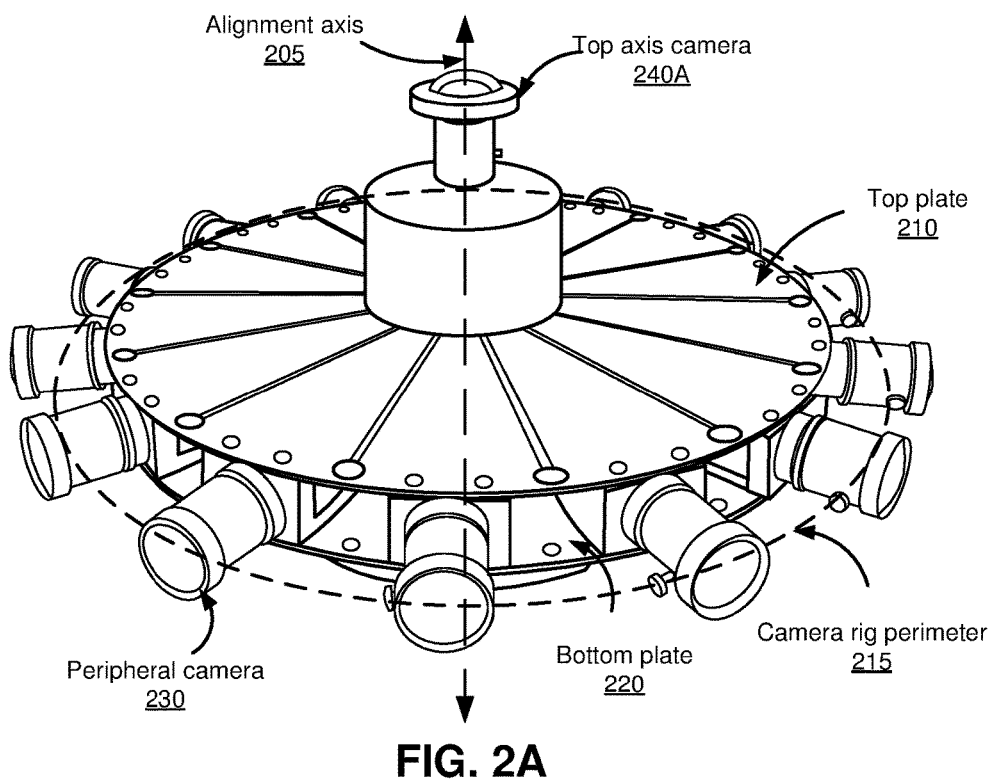
FIG. 2A shows a perspective view of a camera rig system, according to one embodiment.
Figure 2B:
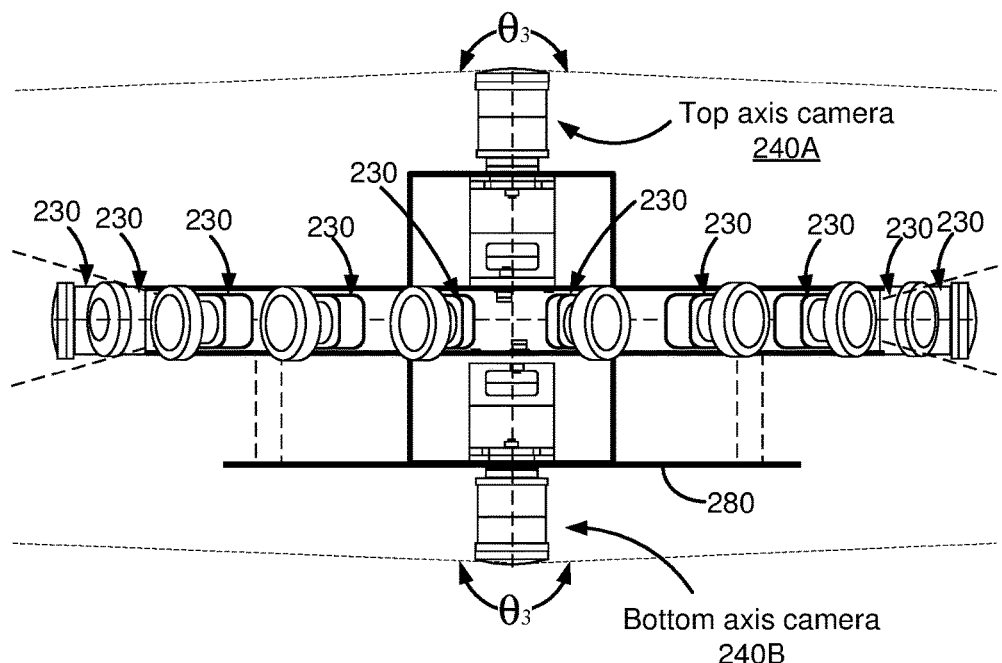
FIG. 2B shows a side view of the camera rig system, according to one embodiment.

FIG. 2A and FIG. 2B show different views of the camera rig system 200, according to one embodiment. In particular, FIG. 2A is a perspective view of the camera rig system 200, according to one embodiment. As shown in FIG. 2A, the camera rig system 200 includes an alignment axis 205, a top plate 210, a bottom plate 220, multiple peripheral cameras 230 and multiple axis cameras 240. The multiple peripheral cameras 230 are arranged such that they form a ring around a central point that is bisected by the alignment axis 205. The camera rig system 200 also includes a camera rig perimeter 215 that shows the perimeter of the ring of the multiple peripheral cameras 230. More specifically, the camera rig perimeter 215 shows the perimeter of a ring on which the lens of each peripheral camera 230 is located. The top plate 210 couples to a top surface of the ring of the peripheral cameras 230 and the bottom plate 220 couples to a bottom surface of the ring of the peripheral cameras 230. The axis cameras 240 are aligned along the alignment axis 205 and are capable of capturing a top view and a bottom view of a local area or a scene. This configuration creates a rigid structure that prevents vibration of the peripheral cameras 230 and allows the peripheral cameras to capture quality images and/or video that are used to generate 360 degree images/video for a VR system, which further allows the peripheral cameras and the axis cameras together to generate a canvas view for the VR system. In more detail, the canvas view of a scene is generated by combining the top view captured by the top axis camera 240A, the bottom view captured by the bottom axis camera 240B (shown in FIG. 2B), and side views captured by the multiple peripheral cameras 230.

In FIG. 2A, fourteen peripheral cameras 230 and two axis cameras including a top axis camera 240 and a bottom axis camera (not shown here) are shown for purposes of illustration. In alternative embodiments not shown, a different number of peripheral cameras 230 and/or axis cameras 240 may be included in the camera rig system 200. Likewise, additional and/or different components may be included in the camera rig system 200. Additionally, the functions performed by the various entities shown in FIG. 2A may differ in different embodiments.

In more detail, the peripheral cameras 230 are designed to capture images and/or video of a 360 degree view of a local area or a scene. As described above, the multiple peripheral cameras 230 are positioned such that they form a ring around a central point that is bisected by the alignment axis 205. The multiple peripheral cameras 230 are also positioned around the central point such that an optical axis of each peripheral camera is within a plane, and a field of view of each peripheral camera faces away from the central point. As shown in FIG. 2A, each peripheral camera 230 is also positioned next to an adjacent peripheral camera at a certain distance and at a certain angle. This configuration allows the captured images and/or video to better simulate a human's perception of vision, which further provides a user wearing the client VR device 180 with enhanced user experience in the VR system.

The axis cameras 240 are designed to capture images and/or videos of top and bottom views of the local area or a scene. Each axis camera 240 is aligned along the alignment axis 205 and oriented such that the optical axis of each axis camera is collinear with the alignment axis. The field of view of each axis camera 240 is directed away from the central point of the camera rig system 200. As shown in FIG. 2A, a top axis camera 240A captures a top view of the local area or the local scene. A bottom axis camera 240B (shown in FIG. 2B) is positioned symmetrically with the top axis camera 240 along the alignment axis 205 to capture a bottom view of the local area. As one example, the top axis camera 240 and the bottom axis camera can include a fish-eye lens, which captures a wide field of view, for example a 180 degree hemisphere field of view.

FIG. 2B shows a side view of the camera rig system 200, according to one embodiment. As described above in FIG. 2A, the lens installed in the top axis camera 240A and the bottom axis camera 240B are fish-eye lenses that have a wide angle of field of view, which is $\theta_3$ shown in FIG. 2B. In alternative embodiments not shown, the angle of field of view, $\theta_3$ can vary. The wide field of views of the lenses installed in the top axis camera 240A and the bottom axis camera 240B makes wide coverage of the top and bottom areas of an environment and provides sufficient overlap with the peripheral cameras 230, such that a high quality 3D-360 degree image can be created.

Figure 3:
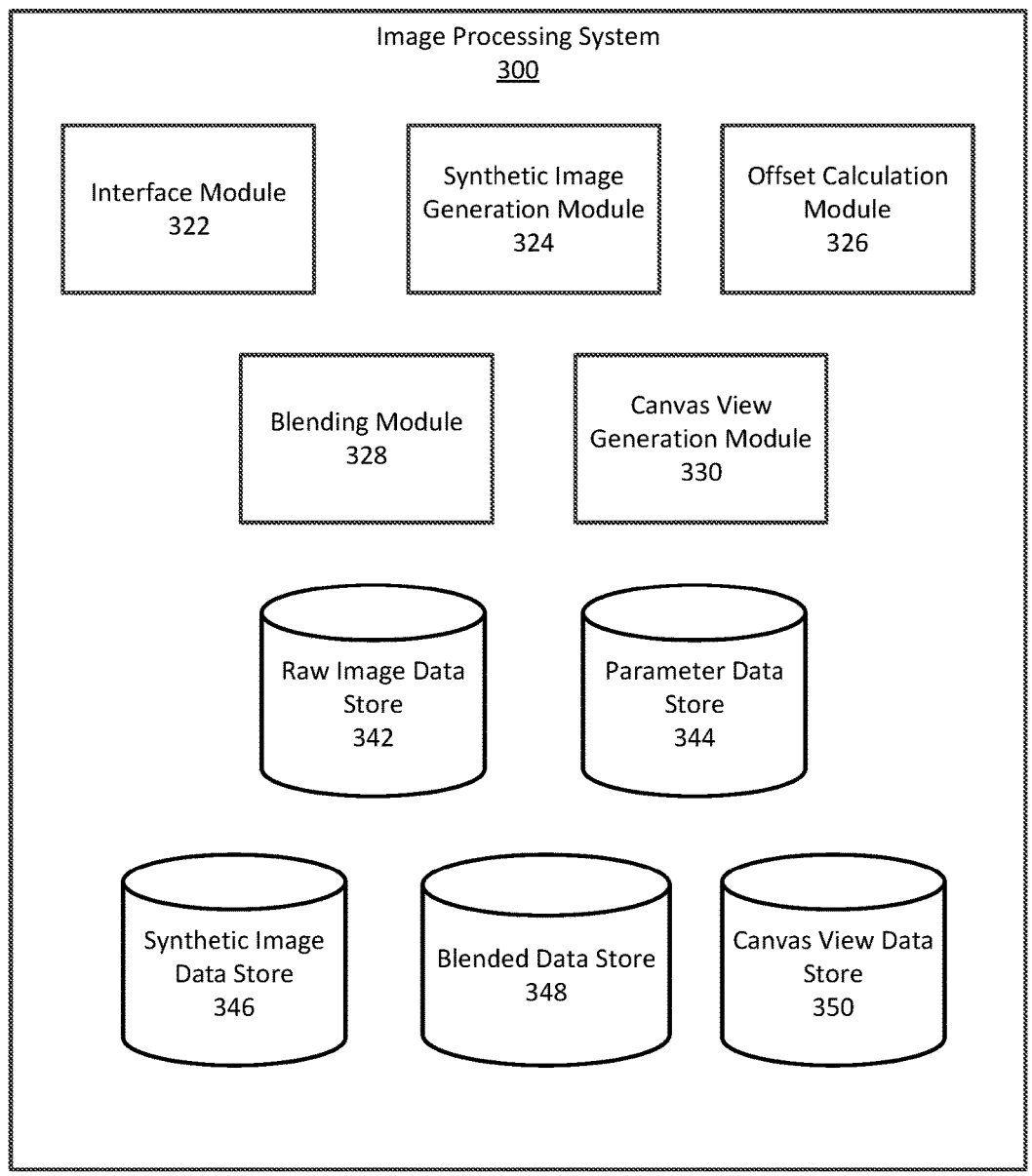
FIG. 3 shows a block diagram of an architecture of the image processing system, according to one embodiment.

FIG. 3 shows an example block diagram of an architecture of the image processing system 300, according to one embodiment. The image processing system 300 receives input from the camera rig system 200, such as images and/or videos captured by the multiple cameras in the camera rig system. For example, the image processing system 300 receives a top image, a bottom image, and side images of a local scene captured by the camera rig system 200. The image processing system 300 generates synthetic side images based on the received images captured by the peripheral cameras 230. The image processing system 300 blends, for each of the left eye view and the right eye view, the top/bottom images onto synthetic side images to create canvas views, which allows a smooth transition between binocular views and monocular views when the user wearing the client VR device 180 intends to look up or down in the virtual scene provided by the client VR device. As more fully described below, the blending process includes shape warping and color morphing, and the shape warping uses optical flow and the color morphing uses alpha blending.

In FIG. 3, the image processing system 300 includes an interface module 322, a synthetic image generation module 324, an offset calculation module 326, a blending module 328, a canvas view generation module 330, a raw image data store 342, a parameter data store 344, a synthetic image data store 346, a blending data store 348 and a canvas view data store 350. In alternative embodiments not shown, additional and/or different components may be included in the image processing system 300. Likewise, the functions performed by various entities of the image processing system 300 may differ in different embodiments.

The interface module 322 receives input data from the camera rig system 200 and/or from the client VR device 180. More specifically, the interface module 322 receives, for a local scene, a top image, a bottom image, and side images captured by the camera rig system 200. The top image is captured by the top axis camera 240A, the bottom image is captured by the bottom axis camera 240B, and the side images are captured by the peripheral cameras 230. The interface module 322 may also receive image data and/or video data related to the images captured by the camera rig system 200. In one embodiment, the interface module 322 may also receive parameter data about the camera rig system 200 and about a user wearing the client VR device 180, as more fully described below. Example parameter data includes the interpupilary distance (IPD) of the user and a zero parallax distance to an object. More examples of parameters are described below in terms of the parameter data store 344. The received images and/or related image data are stored in the image data store 342. The received parameter data is stored in the parameter data store 344.

The interface module 322 may also receive input data from the client VR device 180. As one example, the interface module 322 receives feedback information about views, images and/or data provided to a user who wears the client VR device 180 and provides output data, for example, modified or updated images to render virtual scenes to the user in response to the feedback. More specifically, the interface module 322 provides the client VR device 180 with canvas views generated by the canvas view generation module 330.

The interface module 322 also outputs data to the camera rig system 200 and/or the client VR device 180, as described above. The output data to the client VR device 180 may include images and/or videos, as described above. The output data to the camera rig system 200 may be a request for more images about a different scene.

The synthetic image generation module 324 generates synthetic images including synthetic side images. A synthetic image refers to an image as taken by a synthetic camera located on a point of the camera rig perimeter 215, as further shown in FIG. 4A. In one embodiment, the synthetic image can be created using optical flow between two or more camera images taken by real cameras like peripheral cameras 230. Each of the camera images from adjacent peripheral cameras 230 may be modified by an optical flow towards the other peripheral camera, and the resulting images are combined to generate the synthetic image. In another embodiment, the synthetic image as discussed in this application is created by placing a real peripheral camera to the point where the corresponding synthetic camera should be located.

To create the synthetic image, the synthetic image generation module 324 extracts side images or related image data stored in the raw image data store 342 and parameter data stored in the parameter data store 344. The side images or related data that are extracted may be taken by one or more peripheral cameras 230 close to the point where the synthetic camera is positioned. The parameter data extracted may include the information about a sightline 434 for the corresponding eye as shown in FIG. 4A, and configuration information about the camera rig system 200, for example, the size and shape of the camera rig system 200 to locate the point 431 where the synthetic camera should be located. In some embodiments, identification numbers or indices may be added to the synthetic images and/or related image data to distinguish between the synthetic images from each other.

The offset calculation module 326 calculates offsets within the synthetic images for a canvas view. In more detail, as more fully described below in FIG. 4A-4B, the offset refers to a shift of a synthetic image to generate a portion of the synthetic image that simulates the eye view at the point where the synthetic camera is located when the eye is looking at a specific object in a scene. In more detail, as further described below in FIG. 4B, the middle line of the field of view of the synthetic camera may not align with the sightline of the corresponding eye view of the user, in which case the synthetic image as taken by the synthetic camera is adjusted with the offset to reflect the left eye view of the user from the location 431 of where the synthetic camera should be located.

The offset calculation module 326 extracts parameter data stored in the parameter data store 344, for example, the interpupilary distance 410 of the user, the zero parallax distance of the sightline 434, and the angle 432A. The value of the offset is a function of the interpupilary distance 410, the zero parallax distance of the sightline 434, and the angle 432A. In particular, when the user's eye rotates, for example, the user gradually looks up with the binocular views gradually transiting to monocular views, for the same user and the same camera rig system 200, the offset changes in response to the change of the interpupilary distance 410, as more fully described below in FIG. 4A-B.

The calculated offset is stored in the parameter data store 344. In some embodiments, the different offsets for left eye and right eye for different images of scenes are indexed or labeled with identification numbers to distinguish from each other.

The blending module 328 blends, for each of the left eye and right eye of the user, top/bottom images onto synthetic images to transition between binocular and monocular views. In more detail, taken the top image for the left eye as an example, the blending module 328 extracts top image from the raw image data store 342 and the synthetic image from the synthetic image store 346, and then executes shape warping to blend the top image onto the synthetic image, generating a warped top image. In some embodiments, the process of shape warping is performed via optical flow. The blending module 328 further blends the warped top image onto the same synthetic image for color morphing, generating a blended image ready for creating a canvas view for the left eye. In some embodiments, the process of color morphing is realized via different technologies, and one example technology is alpha blending, as more fully described below. The extent of warping and blending in the images may be a function of the vertical angle within an overlapping portion of the synthetic image and the top image, as more fully discussed in FIG. 5. A similar process is executed for blending the bottom image onto the synthetic image for the left eye via shape warping and color morphing. Additionally, processes similar to above are also executed to blend top/bottom image onto synthetic image for the right eye.

The warped top/bottom images and/or related image data for top/bottom images for the left/right are stored in the blended data store 348. In some embodiments, the warped top/bottom images and/or related image data are indexed or labeled with identification number to distinguish from each other. The blended images and/or related image data for top/bottom images for the left/right are also stored in the blended data store 348. In some embodiments, the blended images and/or related image data are indexed or labeled with identification number to distinguish from each other, or to distinguish from the warped bottom/top images and/or related image data.

The canvas view generation module 330 generates, for each of the left and the right eye, a canvas view. A canvas view refers to a view that combines, for a same scene, the top view, the bottom view and the 360-degree view, which can be any panoramic, spherical panoramic, or suitable wide angle view of the scene. In some embodiments, the canvas view includes all the information about the scene, which is obtained from different images of which taken by top/bottom cameras 240 and peripheral cameras 230 from different perspective of views. As described above, for a single scene, the images of which are captured by various cameras in the camera rig system 200, one canvas view is created for the left eye, and one canvas view is created for the right eye. Instead of simply combining the top/bottom images with side images taken by the peripheral cameras, which may cause image problems such as double vision, the canvas view generation module 330 creates a canvas view for one specific eye (e.g. left/right eye) by combining the blended images generated from top image and bottom image, as more fully described below in FIG. 5. The created canvas view for the corresponding eye allows smooth transition between different views. As one example, the canvas view allows smooth transition between side views when the user looks left and/or right, or front and/or back, with the sightlines 434 of the user's eyes rotating in a same horizontal plane. The side views can be simulated by image taken only by peripheral cameras 230. As another example, the canvas view allows smooth transition between binocular views and monocular views when the user looks up and/or down, with the sightlines 434 of the user's eyes rotating towards up and/or down. The generated canvas views are stored in the canvas view data store 350.

The raw image data store 342 stores images captured by the various cameras in the camera rig system 200, and image data related to the captured images. As one example, the raw image data store 342 stores top/bottom images and related image data, and the top/bottom images are captured by corresponding top/bottom axis cameras 240. The raw image data store 342 also stores side images and related image data, and the side images are captured peripheral cameras 230. The image data may include information about each pixel on the 2D images, such as intensity, gradient and color for each pixel. The images and image data stored in the image data store 322 are used for the synthetic image generation module 324 to generate synthetic images, as described above. The images and image data stored in the image data store 322 are also used for the blending module 328 to generate warped top/bottom images and blended images, as described above.

The parameter data store 344 stores parameter data used to generate synthetic images. The parameter data includes configuration data of the camera rig system 200, for example, the size of the camera rig perimeter 215, the location of each peripheral camera 230 included in the camera rig system, the location of the center point 405 of the camera rig system, etc. The configuration data of the camera rig system 200 also includes the configuration information of each peripheral camera 230 and each axis camera 240, such as the properties of the lenses installed in the cameras, for example, the field of view of the lenses. The parameter data also includes information for simulating the user's view when the eyes of the user are looking at a specific object 445, as more fully described below in FIG. 4A. The information includes interpupilary distance 410 of the user, the zero parallax distance of sightlines 434 for both left eye and right eye, the distance of the central line 440 between the center point 405 and the object 445, the angle 432A between the optical axis 433 and the central line, and etc. The information may be used, for example, to generate synthetic images. The parameter data stored in the parameter data store 344 also includes the offsets calculated by the offset calculation module 326.

The synthetic image data store 346 stores synthetic images and related image data. The image data may include information about each pixel on the 2D images, such as intensity, gradient and color for each pixel.

The blended data store 348 stores the warped top/bottom images and/or related data, and blended images and/or related data. As described above, the warped top/bottom images refer to the top/bottom images warped with the synthetic images in terms of shape of the images. In one embodiment or under one definition, with the top image as an example, the warped top image is a distorted image with the top image being warped with a corresponding synthetic image via optical flow, in which case the warped top image includes a top-only part that is covered only by the top image (i.e., contains the original image data from the top camera), a side-only part that is covered only by the synthetic image, and an overlapped part that is covered by both the top image and the synthetic image. Embodiments similar to above also apply to warped bottom images generated from bottom image. Additionally, for each eye of the left eye and right eye, one warped top image is generated for top image and one warped bottom image is generated for bottom image.

The blended data store 348 also stores blended images for left eye and right eye. As described above, the blended images refer to the synthetic images morphed with the warped top/bottom images in terms of color of the images. In one embodiment or under one definition, taken top image as an example, the blended image is a combined image with the warped top image being morphed onto a corresponding synthetic image via alpha blending, in which case the blended image includes a top-only part that is covered only by the top image, a side-only part that is covered by the warped top image, and an overlapped part that is covered by both the synthetic side image and the warped top image. In this embodiment, a corresponding canvas view can be created directly from the blending image without using the top image any more, since the top-only part is already included in the blended image. Embodiments similar to above also apply to warped bottom images generated from bottom image. Additionally, for each eye of the left eye and right eye, one warped top image is generated for top image and one warped bottom image is generated for bottom image.

The blended images and/or related data stored in the blended data store 348 are used for the canvas view generation module 344 to generate canvas views, as described above.

The canvas view data store 350 stores canvas views and/or related data generated by the canvas view generation model 330. As described above, the canvas view for a specific scene is generated by combing all related images of the scene including top/bottom images and synthetic images. In more detail, the canvas view includes a top-only part that is covered only by top image of the scene, a bottom-only part that is covered only by bottom image of the scene, a side-only part that is covered only by synthetic images of the scene, and overlapped part shared between top/bottom images and synthetic images with them blended together, as described above.

Figure 4A:
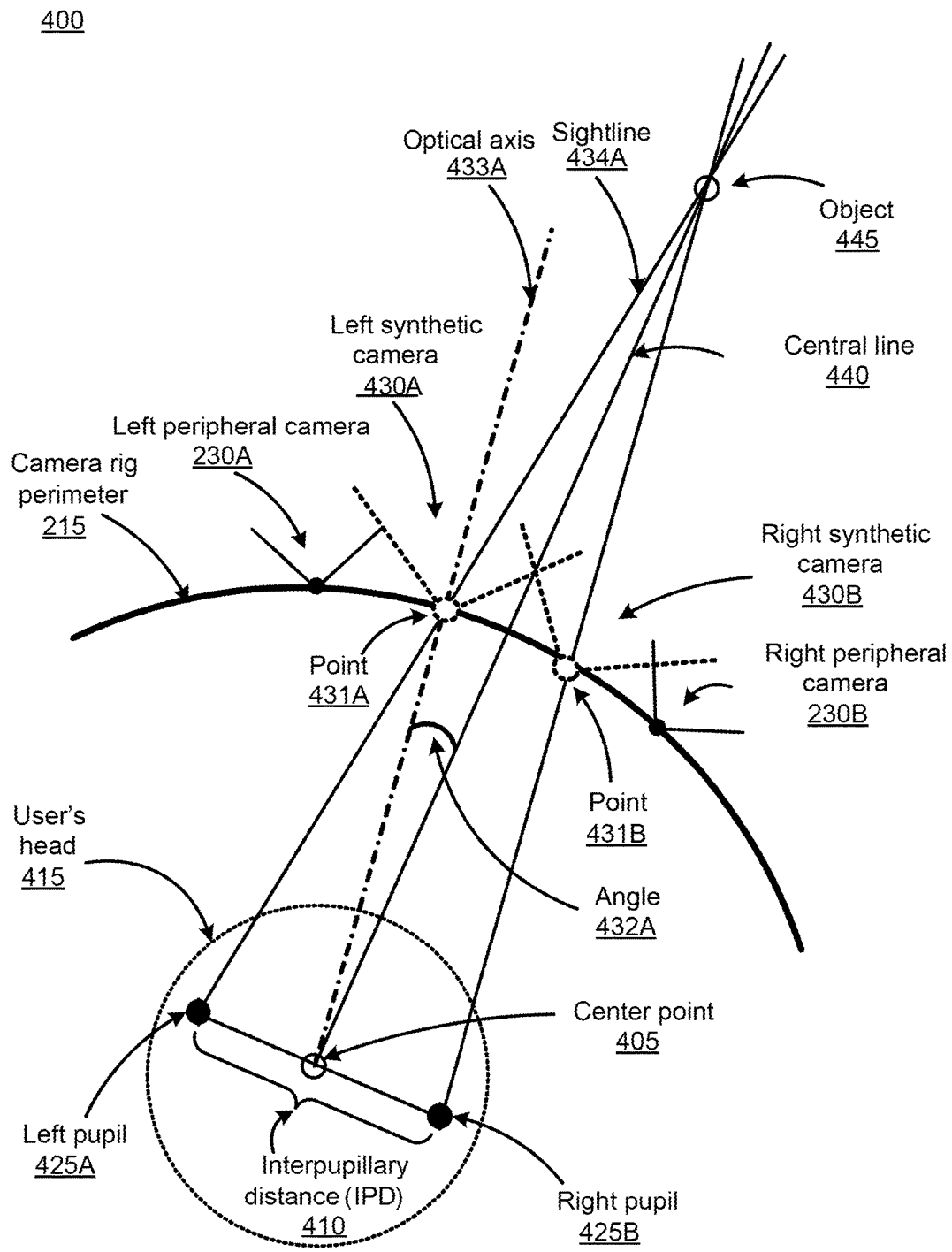
FIG. 4A shows a line diagram illustrating an environment simulating views of the users' eyes looking at an object using the camera rig system, according to one embodiment.

FIG. 4A shows a line diagram illustrating an environment 400 simulating views of the users' eyes verging on an object 445 using the camera rig system 200, according to one embodiment. The environment 400 shown in FIG. 4A includes part of the camera rig system 200, a left pupil 425A and a right pupil 425B corresponding to the left eye and right eye of a user's head 415, a left synthetic camera 430A and a right synthetic camera 430B, and an object 445 which the eyes are looking at. The object 445 is any suitable object that is placed outside the camera rig system 200 in a range where the cameras of the camera rig system are capable of capturing images of the object, and the images are suitable for future processing by the image processing system 300. The object may be an actual object, or merely represent a point to which the sightline for each eye is directed.

The part of the camera rig system 200 shown in FIG. 4A further includes the center point 405, the camera rig perimeter 215, a left peripheral camera 230A and a right peripheral camera 230A. As described above, the user wearing the client VR device 180 views and experiences a virtual scene captured by the camera rig system 200, in which case, in the virtual scene, the user is simulated as standing in the center point 405 of the camera rig system with the center between the left pupil 425A and the right pupil 425B being overlapped with the center point 405 of the camera rig system. In addition, the environment 400 simulates the views of the left and right eye of the user standing in the center point 405 with the user's head 415 facing towards the object 445 and the eyes verging on the object. The environment 400 further includes a sightline 434A between the left pupil 425A and the object 445, a sightline 434B between the right pupil 425B and the object, and a central line 440 between the center point 405 and the object.

To determine the location for the synthetic cameras 430, sightlines are simulated for each pupil 425 to the object 445. The points at which the sightlines intersect the camera rig perimeter 215 are the location at which the synthetic cameras 430 are placed for determining a view when the user looks in the direction of the object. Stated another way, the view towards that object also represents a light field that the pupil would experience when focused on that object 445. As shown in FIG. 4A, the left sightline 434A intersects the camera rig perimeter 215 at the point 431A. Similarly, the right sightline 434B intersects the camera rig perimeter 215 at the point 431B. As described above, the synthetic camera 430A used to simulate the left eye view at the point 431A is placed at the point 431A, and the synthetic camera 430B used to simulate the right eye view at the point 431B is located at the point 431B. As shown in FIG. 4A, although the optical axis 433A of the left synthetic camera 430A and the central line 440 originates from the same point, the center point 405, the optical axis and the central line diverges in different directions when radiating away from the center point, generating the angle 432A between the optical axis and the central line.

As described above, a synthetic image is generated for each of the synthetic cameras 430. The view of the synthetic image, however, may have a field of view that is not centered on the object 445. Rather, the field of view of the synthetic image may be given by the optical axis 433, for example as shown here for left synthetic camera 430A by optical axis 433A. Thus, the middle column of pixels in the synthetic view may correspond to an area that is pointed by the optical axis 433A of the left synthetic camera. However, the left pupil 425A is directing towards the object 445 in a different direction with the optical axis 433A of the left synthetic camera 430A, in which case, the synthetic image will be adjusted with the offset when creating the canvas view, as described above. The environment 400 in FIG. 4A shows only the optical axis 433A for the left synthetic camera 430A to simplify the description. It should be understood that in alternative embodiments not shown, the optical axis of the right synthetic camera 430B can also be included in the environment 400, and similar to the synthetic image of the left synthetic camera 430A, the synthetic image of the right synthetic camera is also adjusted with an offset to simulate the view at the point 431B of the right eye.

As described above in FIG. 3, the angle 432A and the offset are functions of parameters such as interpupiliary distance 410 and the distance of the central line 440. As more fully described below, the interpupilary distance 410 may also be a function of the vertical angle, $\phi$.

Figure 4B:
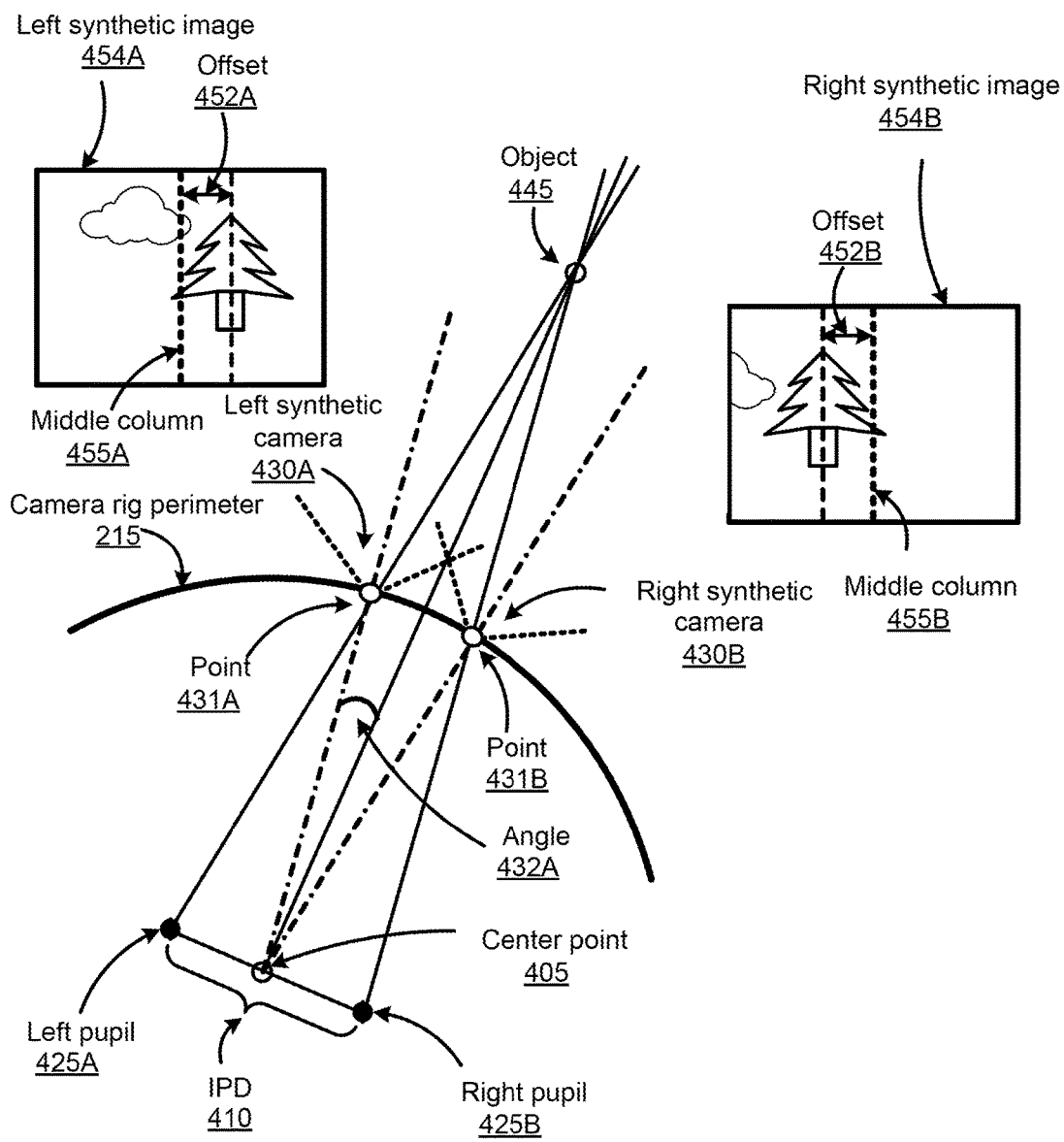
FIG. 4B shows a line diagram illustrating a process of identifying offsets to synthetic images simulating views of the user's left eye and right eye, according to one embodiment.

FIG. 4B shows a line diagram 450 illustrating the offsets to synthetic images, according to one embodiment. The line diagram 450 includes part of the environment 400 shown in FIG. 4A, a left synthetic image 454A, a right synthetic image 454B, and offsets 452A and 452B. The part of the environment 400 shown in FIG. 4A is illustrated in FIG. 4A, in which case detailed description of the composition of the part of the environment is not provided here.

The left synthetic image 454A is generated by the image processing system 300 as if it is taken by the left synthetic camera 430A located at the point 431A, and the right synthetic image 454B is generated by the image processing system 300 as if it is taken by the right synthetic camera 430B located at the point 431B. More specifically, the left synthetic image 454A and the right synthetic image 454B are images of the same scene, which includes a cloud and a tree with the tree appearing on the right of the cloud, which indicates the scene of the object 445 "captured" by the synthetic camera 430A. As shown in FIG. 4B, the tree is located relatively on the right of the middle column 455A in the left synthetic image 454A, while the tree is located relatively on the left of the middle column 455B in the right synthetic image 454B. The differences of the position of the tree relative to the middle lines 455 in the corresponding left/right synthetic images 454 is due to the differences of the radiation direction of the optical axis 433 (shown in FIG. 4A) of the two synthetic cameras 430. The left/right synthetic images 454 are merely one example, and in alternative embodiments not shown, the specific objects (e.g., cloud and tree) may be located in different places in the images other than the places in the images shown in FIG. 4B.

As indicated, the offset 452 A is used to adjust the pixels used to represent the left pupil 425A in viewing in the direction of central line 440. Similarly, the offset 452B is used to adjust the pixels used to represent the right pupil 425B for generating the corresponding right side view. The left synthetic image 454A is generated to simulate the left eye view of the object 445 at the point 431A, in which case the left pupil 425A looks at the object 445 and the sightline 434A (shown in FIG. 4A) is directed to the object 445. Thus, the offset 452A is calculated by the image processing system 300 based on the parameters of the environment 400, as described above in FIG. 3. More specifically, the value of the offset 452B is a function of the IPD 410, and the IPD is a function of the vertical angle ϕ, 482 of a simulated sphere 480, as more fully described below.

Figure 4C:
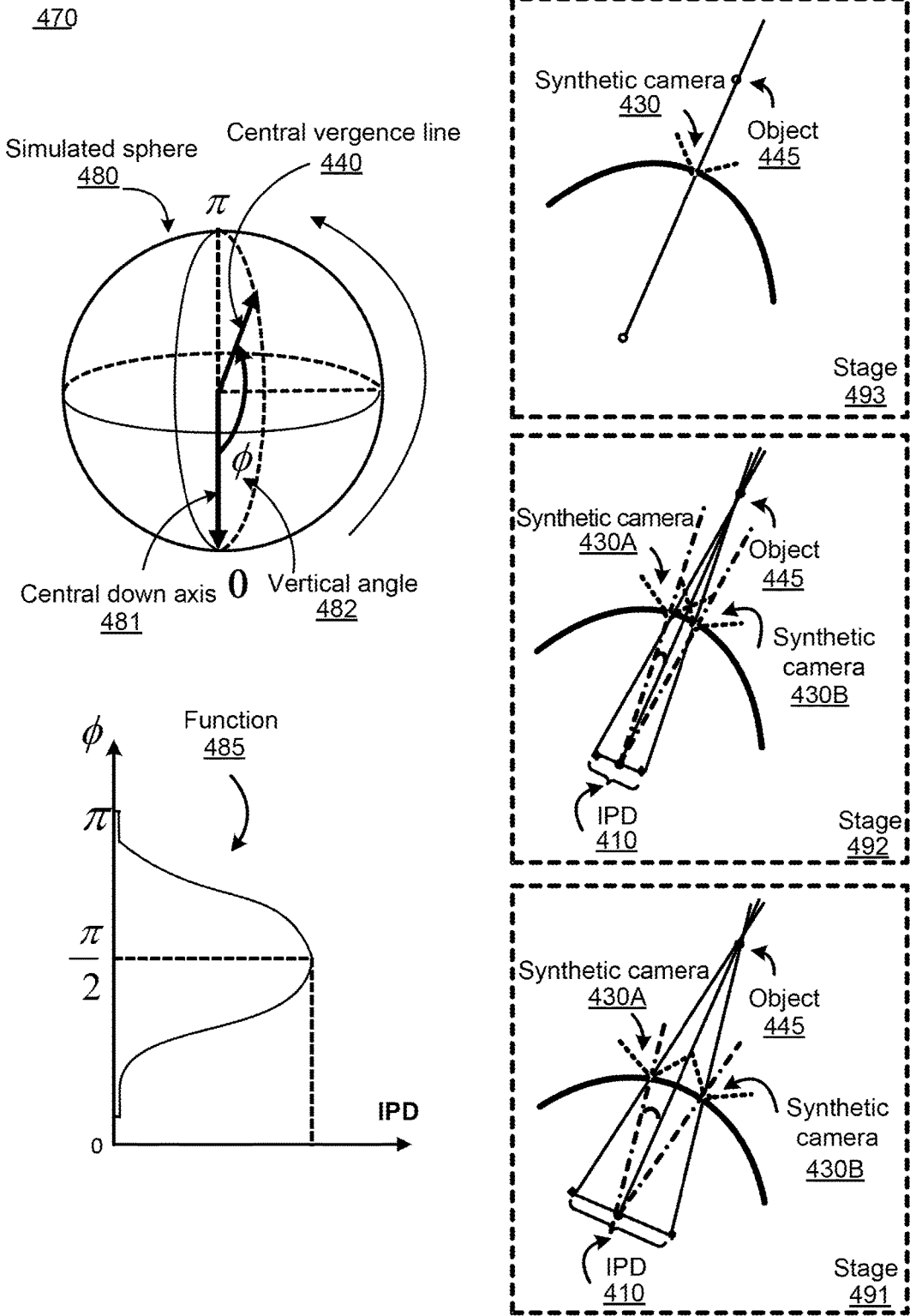
FIG. 4C shows a line diagram illustrating the change of a interpupilary distance in response to the change of a vertical angle, according to one embodiment.

FIG. 4C shows a line diagram 470 illustrating the change of the interpupilary distance 410 in response to the change of vertical angle ϕ 482, according to one embodiment. In FIG. 4C, the line diagram 470 shows a simulated sphere 480 illustrating the change of the vertical angle ϕ 482, and a function 485 illustrating the mathematical relationship between the IPD 410 and the vertical angle ϕ 482. The line diagram 470 also shows three stages 491, 492 and 493 of the change of IPD 410 as the vertical angle ϕ 482 changes, as more fully described below.

The vertical angle ϕ 482 shown in the sphere 480 has a range from 0 to π, measuring the angle between the central down axis 481 and the central line 440. More specifically, the line diagram 470 simulates the change of the IPD 410 of the user when the user standing in the center point 405 of the environment 400 (shown in FIG. 4A) looks up or down. For example, as the user gradually looks from the most bottom part towards the most top part in his/her viewing field, the vertical angle ϕ, 482 correspondingly changes from 0 to π, and the IPD 410 first gradually increases from 0 to a maximal value and then gradually decreases from the maximal value to 0, which further indicates that the left and right eye views of the user first changes from monocular to binocular and then changes from binocular to monocular. In particular, when the user's eye hits the most bottom part in his/her viewing field, the value of the vertical angle ϕ, 482 is 0, when the user's eye hits the horizontal line in his/her viewing field, the value of the vertical angle ϕ, 482 is π/2, and when the user's eye hits the most top part in his/her viewing field, the value of the vertical angle ϕ, 482 is π. Correspondingly, as shown by the function 485, the value of the IPD 410 is approximately 0 when the value of the vertical angle ϕ, 482 is approximately 0 or π, and the IPD has its maximal value when the value of the vertical angle ϕ is π/2. As shown by the function 485, the IPD 410 receives value of 0 as the vertical angle ϕ, 482 approaches 0 or π before the angle actually hits 0 or π. The function 485 is merely one example for purpose of illustration. In reality, the exact mathematic curve between the IPD 410 and the vertical angle ϕ, 482 may be slightly different than the function 485 shown in FIG. 4C.

The three stages 491, 492 and 493 shown in FIG. 4C illustrates three specific stages as the user's eyes are directed from the horizontal line towards the most top part in his/her viewing field, indicating the value of the vertical angle ϕ gradually changing from or π/2 to π. More specifically, the stage 491 shows when the user's eye is looking at the horizontal line in his/her viewing field, the IPD 410 has its maximal value (e.g., at π/2). In the stage 491, two sightlines 434 of both left and right eye intersect the camera rig perimeter 215 at two points at which the two synthetic cameras 430 are located. The stage 492 shows when the user's eye is verging on somewhere between the horizontal line (π/2) and the most top part in his/her viewing field (π), the IPD 410 has a reduced value compared with that in the stage 491 maximal. In the stage 492, two sightlines 434 of both left and right eye intersect the camera rig perimeter 215 at two points at which the two synthetic cameras 430 are located, and the two points are located closer to each other in comparison with that in the stage 491. The stage 493 shows when the user's eye is verging on the most top part in his/her viewing field, the value IPD 410 is reduced to 0. In the stage 493, two sightlines 434 of both left and right eye overlap with each other and the overlapped sightlines intersect the camera rig perimeter 215 at the same point at which the two synthetic cameras 430 are located, and the two synthetic cameras for both eyes overlap with each other at that point. In this way, by adjusting the IPD as a function of vertical angle, the view smoothly transitions to a single synthetic camera position, and the transition to the single top or bottom camera is more seamless to the user. Because the camera locations are synthetic, the system may compute the synthetic cameras easily for the different IPD distances using function 485.

The stages 491-493 show merely one example. In alternative embodiments not shown, other stages representing other changes of the IPD 410 can be included.

Figure 5:
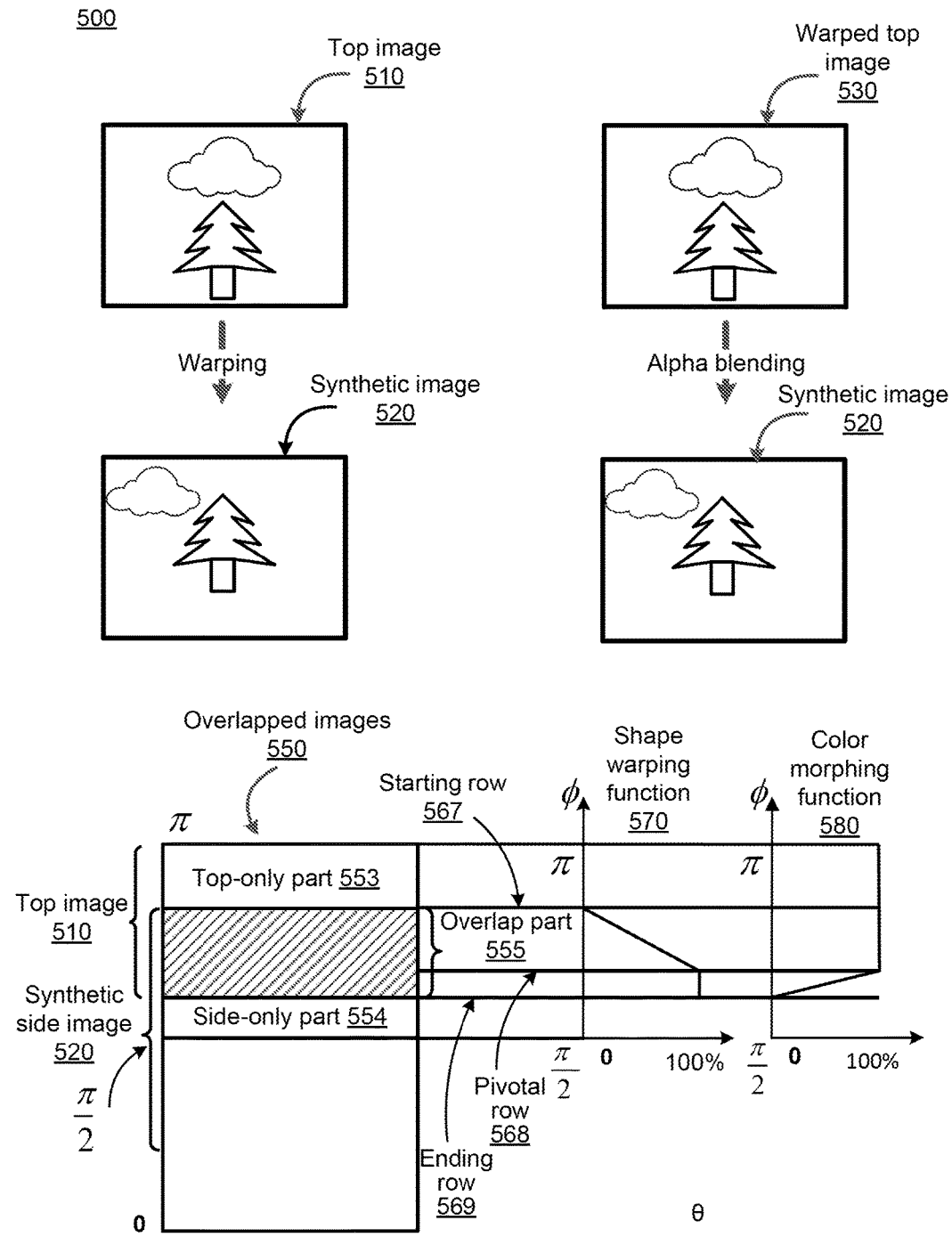
FIG. 5 shows a line diagram illustrating image blending for top/bottom images onto synthetic images to generate a canvas view, according to one embodiment.

FIG. 5 shows a line diagram illustrating image blending for top/bottom images onto synthetic side images to generate canvas views, according to one embodiment. In FIG. 5, the line diagram 500 includes a top image 510, a synthetic side image 520, and a warped top image 530 and all the images here contains image data about a same scene, for example, a scene including a cloud and a tree, as shown in FIG. 4B. The line diagram also includes overlapped images 550, a shape warping function, and a color morphing function, which illustrates the process of the image blending, as more fully described below. To simplify the description, the top image 510, the synthetic side image 520, and the warped top image 530 are all for one single eye (e.g., left/right eye) of the user and for only blending the top image with the synthetic side image. A similar process of image blending for the same eye may be executed to blend a bottom image onto the synthetic image 520, to generate a corresponding warped bottom image, and to further generate a corresponding blended image. Likewise, similar processes of image blending for the other eye of the user for both top and bottom images are executed. Additionally, the images 510-530 shown in FIG. 5 are merely one example for purpose of illustration, the accurate detailed location, shape and color of the objects (e.g. cloud and tree) in the scene depend on the cameras capturing related images used to create the images 510-530 shown in FIG. 5.

The top image 510 is first warped towards the synthetic image 520 to smooth the transition between the top image and the side image in terms of shape between the two images when blended together. The warping changes the shape of objects in the top image to at least partially match the shape of objects in the side image. An optical flow is determined between overlapping portions of the top image and the side image. To warp the image, the optical flow is applied to the top image. As noted below, depending on the vertical angle, the portion of the optical flow that is applied to the top image via a shape warping function 570 may increase from zero to 100 percent through the overlapping portion of the side and top images. After the top image 510 is warped onto the synthetic image 520, the warped top image 530 is generated that has smooth transition in terms of shape between the top image and the synthetic image.

The warped top image is color morphed to match any color discrepancy with the side image when the vertical view of the scene reaches the portion that includes only the side image. In more detail, the warped top image 530 is morphed onto the synthetic side image 520 to realize smooth transition in terms of color between the two images when blended together. Technologies like alpha blending may be used to realize the color morphing. After the warped top image 530 is morphed onto the synthetic image 520, a blended image (not shown here) is generated that has smooth transition in terms of both shape and color between the top image and the synthetic image 520 as a function of the vertical angle. The definition and more detailed description of a blended image is described above in FIG. 3.

The line diagram 500 in FIG. 5 also illustrates the overlapped images 500, the shape warping function 570, and the color morphing function 580, which together illustrates the image blending described above. The overlapped images 550 show the top image 510 overlapping with the synthetic image 520. The overlapped images 550 further show a top-only part 553, a side-only part 554 and an overlap part 555. The top-only part 553 shows the most top region of the top image 510, which is a view provided only by the top camera. The side-only part 554 shows the most bottom region of the synthetic image 520 and it is provided only by the synthetic side image. The overlap part 555 shows a region that is shared by the top image 510 and the synthetic image 520, and the overlap part 555 corresponds to a relatively bottom part of the top image and corresponds to a relatively top part of the synthetic side image. The overlapped images 550 also show the change of the vertical angle $\phi$ that corresponds to different parts of the overlapped images. For example, the vertical angle $\phi$ with a value of $\pi$ corresponds to the top end of the top image 510, and the vertical angle $\phi$ with a value of $\pi/2$ corresponds to the bottom end of the synthetic image 520. A starting row 567 and an end rowing 569 are also shown in FIG. 5 to illustrate the starting part and the ending part of the overlap part 555 with respect to the top camera view. A pivotal row 568, shown in FIG. 5, refers to a row of the overlapped images 555 where the modifications to the top image change from warping to color morphing. Though shown here as a single row, there may be more than one row during which the top camera is fully warped but has not yet begun color morphing with the side image.

FIG. 5 also shows a shape warping function 570 and a color morphing function 580, which illustrate the percentage of shape warping and color morphing performed as a function of vertical angle $\phi$. For each of the functions 570 and 580, the vertical axis shows the vertical angle $\phi$ and the horizontal axis shows percentage of the blending that is applied. For example, for the shape warping function 470, the horizontal axis shows how much percentage of the warping is applied, namely, how much percentage of the top image 510 is applied onto the synthetic image 520 in terms of shape warping. Similarly, for the color morphing function 480, the horizontal axis shows how much percentage of the color morphing is applied, namely, how much percentage of the top image 510 is applied onto the synthetic image 520 in terms of alpha blending that is used for color morphing.

As shown in FIG. 5, for the shape warping, for the top-only part 553 that is above the starting row 567, the warping remains 0 indicating no shape warping is applied for that part. The warping starts to increase from 0 to 100% from the starting row 567 to the pivotal row 568. The pivotal row 569 indicates where the shape warping is 100%, indicating 100% of the corresponding overlap part 555 of the top image 510 is warped onto the corresponding overlap part 555 of the synthetic image 520. For the side-only part 554 that is below the pivotal row 568 and above the ending row 569, the warping remains 100%. For the side-only part 554, there is no shape warping from the top image 510 onto the synthetic side image 520 since that part is not shared by the top image.

For the color morphing, namely, the alpha blending, for the top-only part 553 that is above the pivotal row 568, the alpha blending remains 100% indicating that the color components of the top image are maintained. The alpha blending starts to decrease from 100% to 0 from the pivotal row 568 to the ending row 569. The pivotal row 569 indicates where the alpha blending begins to decrease from 100%, indicating that less than 100% of the top image color components are used, and the remaining portion of the side image is used. For the side-only part 554, the alpha blending remains 0, indicating there is no alpha blending for color morphing from the top image 510 onto the synthetic image 520 since that part is not shared by the top image. In this way, as a user begins to look downward from the top image, the shape components of the top camera may gradually adopt the shape of the side image, and then adopt the color of the side image. As the IPD is also increasing, the user's perspective of binocular vision will increase and the smooth shape and color blending reduces any tears, slips, or jumps between views during the transition to the side camera.

Figure 6:
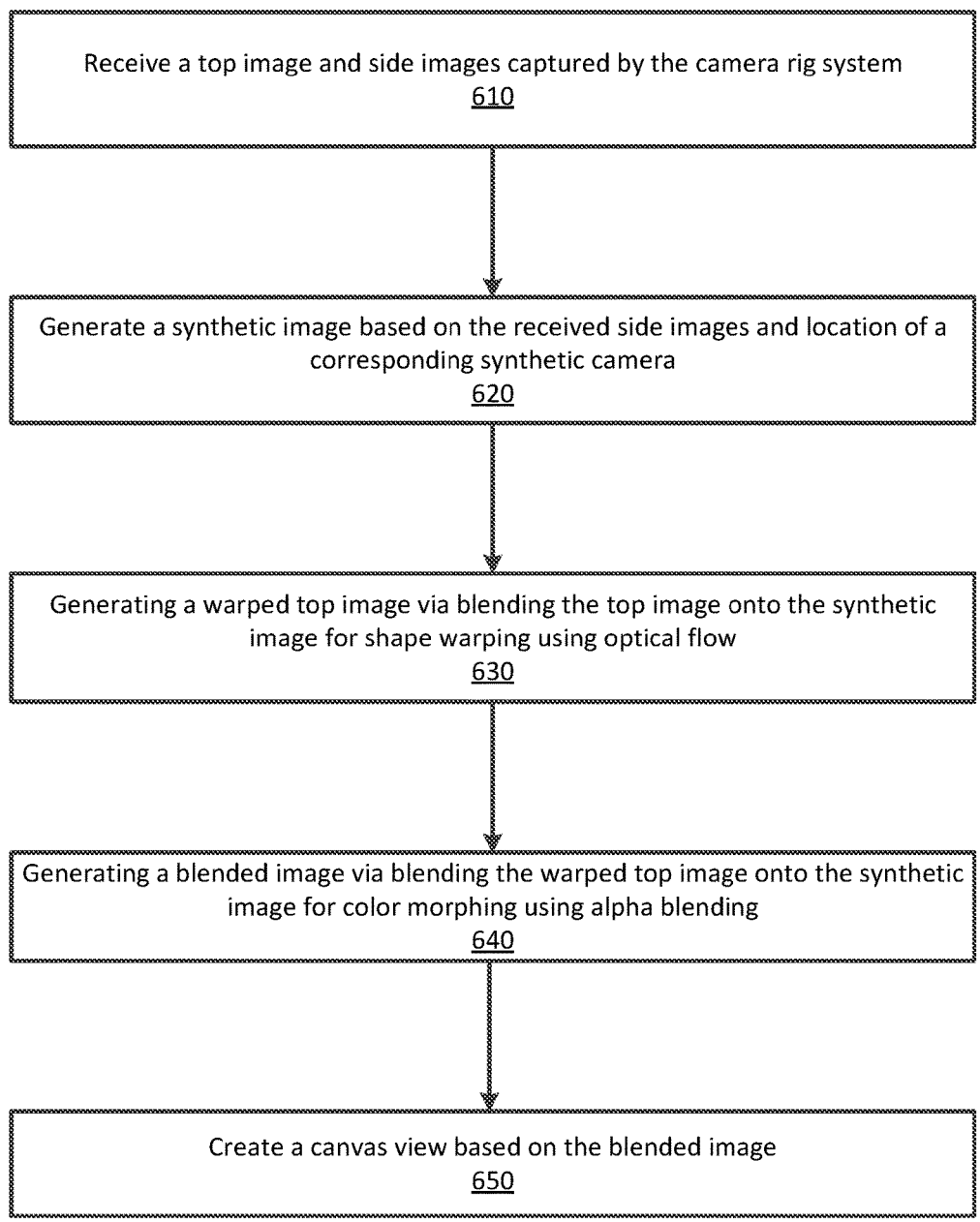
FIG. 6 shows an example flowchart illustrating a process of generating synthetic images and executing image blending of a top image onto a corresponding synthetic image via the image processing system, according to one embodiment.

FIG. 6 shows an example flowchart 600 illustrating a process of generating synthetic images and image blending of a top image onto a corresponding synthetic image via the image processing system 300, according to one embodiment. To simplify the description, the flowchart 600 shown in FIG. 6 illustrate only the generation of the synthetic image for one eye view (e.g., the left eye view), and only the blending of top image with the synthetic image. It should be understood that a similar process, for the other eye view (e.g., the right eye view), is executed to generate a corresponding synthetic image and to blend top image onto the synthetic image. Likewise, for a same eye view, a process similar to step 640 and 650 in the flowchart 600 is executed to blend a bottom image onto the corresponding synthetic image, as more fully described below.

Initially, the image processing system 300 receives 610, for a same scene, top/bottom images and side images captured by the camera rig system 200 for one eye view of a user. The image processing system 300 generates 620 a synthetic image for the eye view based on the received side images and the location of the corresponding synthetic camera that "captures" the synthetic image. After the synthetic image is ready for use, the image processing system 300 executes image blending to blend the top image onto the synthetic image. In more detail, the image processing system 300 generates 630 a warped top image by warping the top image onto the synthetic image using optical flow, and generates 640 a blended image by blending the warped top image onto the synthetic image for color morphing using alpha blending. The image processing system 300 uses 650 the generated blended image for future canvas view generation, during which the offset is applied to reflect actual view of the user eye.

As described above, for the same eye view, the steps 640 and 650 are also executed for blending the bottom image onto the synthetic side image.

Figure 7:
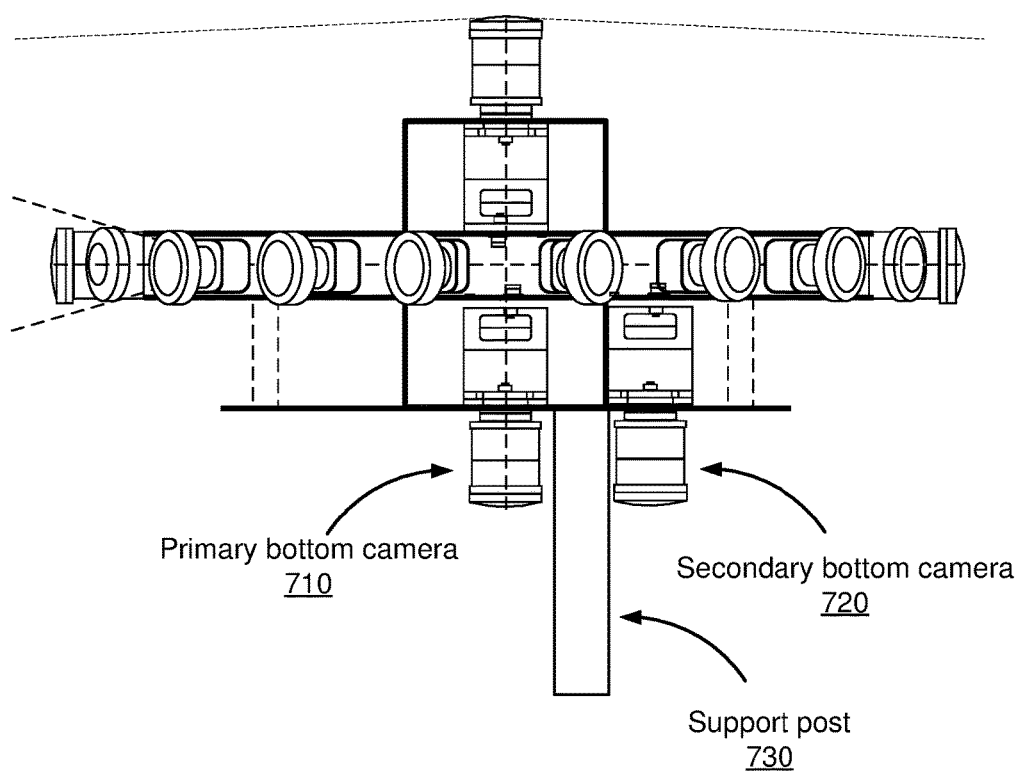
FIG. 7 shows an example camera rig system with an occluded bottom camera, according to one embodiment.

FIG. 7 shows an example camera rig system 700 with an occluded bottom camera, according to one embodiment. As, shown in FIG. 7, as one example of the camera rig system 200 shown in FIGS. 1-2B, in this example, the camera rig system 700 is supported by a support post 730 that extends below the camera rig system, and can hold the camera rig system, for example in midair for capture of various portions of the scene. With respect to a primary bottom image reflecting the primary bottom camera view (or any single camera on the bottom), a portion of the view for the primary bottom camera 710 is blocked by the support post 730, which can prevent a seamless view of the remaining portions of the environment around the camera rig system 700. The use of a secondary bottom camera 710 and optical flow between the secondary and primary camera can eliminate the occlusion from a combined bottom camera view and permit the illusion that the rig is not supported at all. The combined bottom view may be used, for example, for a canvas view or to blend with a side view as previously described.

Figure 8:
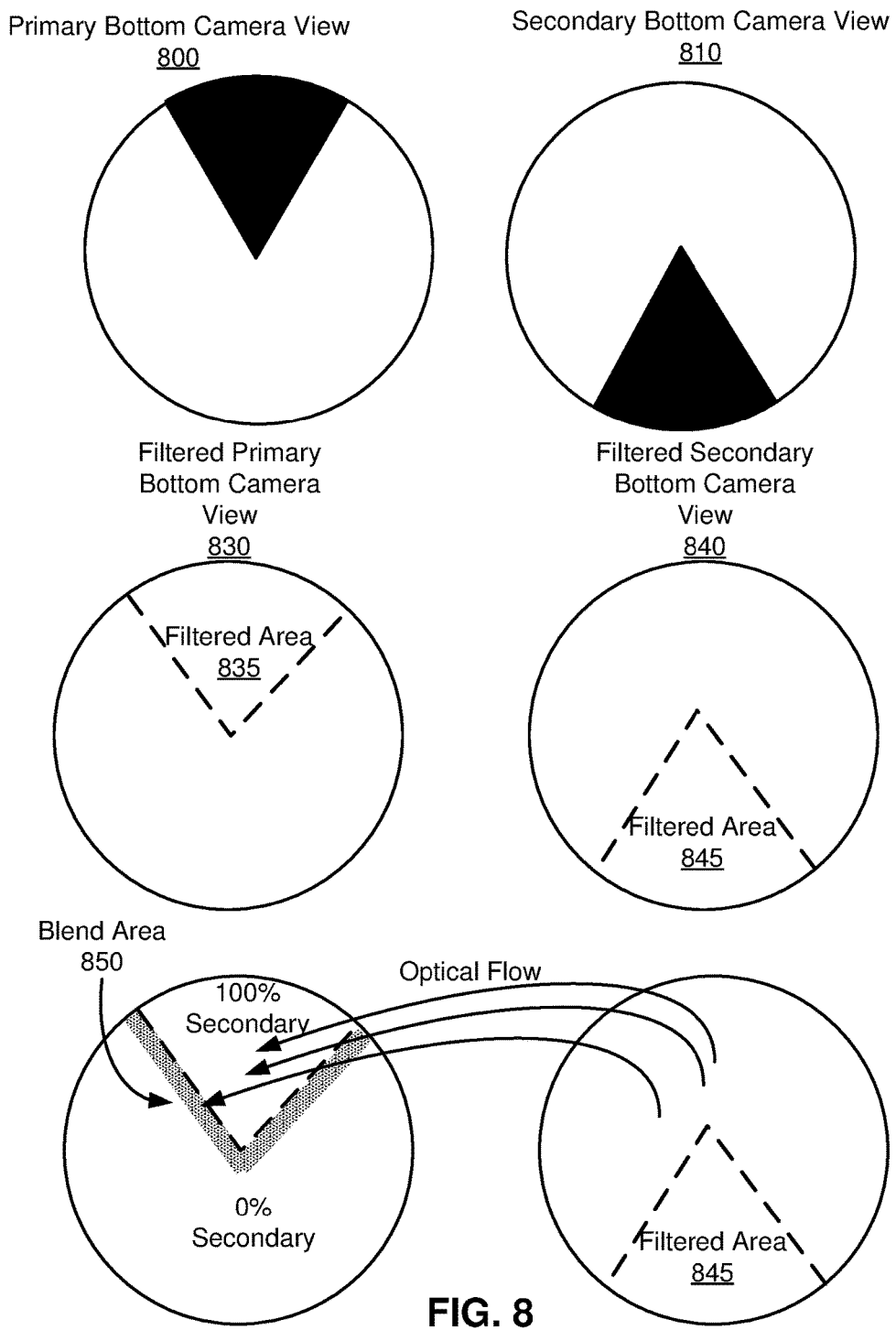
FIG. 8 shows camera views of a primary bottom image and a secondary bottom image, taken by a primary bottom camera and a secondary bottom camera, respectively, according to one embodiment.

FIG. 8 shows camera views of a primary bottom image 800 and a secondary bottom image 810, taken by the primary bottom camera 710 and secondary bottom camera 720, respectively, according to one embodiment. As shown, the primary bottom camera view may be occluded by the support post 730. Similarly, a different portion of the secondary bottom camera may also be occluded by the support post 730.

To generate a combined view that removes the support post, an area of the primary bottom camera and an area of the secondary bottom camera are identified that include the support post. This identification may be made manually by an operator, or the support post may be automatically identified from the views, for example using known data about the appearance of the support post, edge detection algorithms, and similar techniques. The identification indicates a filtered area 835 for a filtered bottom camera view 830, and a filtered area 845 for the filtered secondary bottom camera view 840. In the filtered area, the image values (i.e., the pixel data) of the views are removed or masked, for example from the alpha channel of the images.

Using the masked areas, an optical flow is calculated from the secondary bottom camera view to the primary camera view. Within the filtered areas, the optical flow algorithm discards the optical flow results for the secondary camera view, and does not accord the optical flow any weight according to its match to the primary camera. That is, portions of the secondary camera that are identified as flowing into the filtered area 835 are not provided weight in evaluating the success of the optical flow. However, these portions may be weight according to their consistency with other portions of the optical flow from the secondary camera view. Thus, the secondary camera view can be flowed to fill in the filtered area 835 of the primary bottom camera view.

To fill in the filtered area 835 of the primary bottom camera view, the secondary camera image is warped according to the optical flow to the primary camera. Next, the warped secondary camera image is color merged with the primary bottom camera view based on the location in the primary camera. For most of the primary camera view, the primary camera has an actual view of the environment. For that portion of the primary camera view, the primary camera maintains 100% of its color components and it receives 0% of the color from the warped secondary view. For the portion of the primary camera view that is filtered, the color components may be received only from the secondary camera, and the warped secondary camera color components are used 100% in this portion. In a blend area 850 that surrounds the filtered area 835, the color components of the secondary camera are transitioned from 100% to 0%, such that a portion of the secondary camera components are blended with portions of the primary camera. In one embodiment, the color components are a linear function of the distance from 100% and 0% blend components. In another example, the color components are similarly combined, but also selected based on the magnitude of the color difference and the amount of optical flow of the secondary camera view. When the magnitude of the color components is significantly different, the selection of the color components is more heavily weighted towards the amount of optical flow in the secondary camera. Because the primary camera has no optical flow, typically its color value is more heavily weighted when there is a significant color magnitude discrepancy.

By combining the secondary camera view with the primary bottom camera view, the support beam may be effectively removed from the combined view. In addition, because the primary camera view is centered with respect to, e.g., an alignment axis 205 as shown in FIG. 2A, the combined bottom camera may be easily used in other techniques for generating a canvas as described above.

Additional Configuration Information

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
    identifying a horizontal angle and vertical angle of view for a portion of a display for an eye, the horizontal angle and vertical angle representing a portion of a canvas for view by the eye;
    identifying an overlapping portion of a top image and an image corresponding to a view for the eye, the images being combined to generate the canvas for view by the eye;
    determining an optical flow for the overlapping portion; and
    applying the optical flow to the top image as a function of the vertical angle, wherein a portion of the optical flow applied to the top image increases from a vertical angle when the overlapping portion begins adjacent to the top image to a pivotal row in the overlapping portion.

2. The method of claim 1, further comprising:
    for each of a left eye image and a right eye image: morphing a color of the top image with a corresponding image between the pivotal row and a side-only portion of the corresponding image where the overlapping portion is adjacent to the side-only portion.

3. The method of claim 2, wherein the color morphing ranges from zero to complete color morphing of a side-only image color between the pivotal row and the overlapping portion adjacent to the side-only portion.

4. The method of claim 1, wherein a left eye view and a right eye view are separated by a distance as a function of an interpupillary distance (IPD) between the left eye view and the right eye view.

5. The method of claim 4, wherein the IPD is a function of the vertical angle of the scene.

6. The method of claim 5, wherein at a vertical angle of π/2, the IPD is a maximum IPD, and at a vertical angle of π, the IPD is zero.

7. The method of claim 1, further comprising calculating a shift of the image to generate a portion of the image that simulates the eye view at a point where a camera is located when the eye is looking at a specific image in a scene.

8. The method of claim 1, wherein the optical flow is calculated from a secondary view to a primary view and wherein the secondary view is combined with the primary view using the optical flow.

9. A non-transitory computer-readable storage medium storing computer program instructions, the computer program instructions when executed by a computer processor causes the processor to perform steps of:
    identifying a horizontal angle and vertical angle of view for a portion of a display for an eye, the horizontal angle and vertical angle representing a portion of a canvas for view by the eye;
    identifying an overlapping portion of a top image and an image corresponding to a view for the eye, the images being combined to generate the canvas for view by the eye;
    determining an optical flow for the overlapping portion; and
    applying the optical flow to the top image as a function of the vertical angle, wherein a portion of the optical flow applied to the top image increases from a vertical angle when the overlapping portion begins adjacent to the top image to a pivotal row in the overlapping portion.

10. The non-transitory computer-readable storage medium of claim 9, the instructions, when executed, further causing the processor to:
    for each of a left and a right eye images: morph a color of the top image with a corresponding image between the pivotal row and a side-only portion of the corresponding image where the overlapping portion is adjacent to the side-only portion.

11. The non-transitory computer-readable storage medium of claim 10, wherein the color morphing ranges from zero to complete color morphing of a side-only image color between the pivotal row and the overlapping portion adjacent to the side-only portion.

12. The non-transitory computer-readable storage medium of claim 9, wherein a left eye view and a right eye view are separated by a distance as a function of an interpupillary distance (IPD) between the left eye view and the right eye view.

13. The non-transitory computer-readable storage medium of claim 12, wherein the IPD is a function of the vertical angle of the scene.

14. The non-transitory computer-readable storage medium of claim 13, wherein at a vertical angle of π/2, the IPD is a maximum IPD, and at a vertical angle of π, the IPD is zero.

15. The non-transitory computer-readable storage medium of claim 9, the instructions, when executed, further causing the processor to calculate a shift of the image to generate a portion of the image that simulates the eye view at a point where a camera is located when the eye is looking at a specific image in a scene.

16. The non-transitory computer-readable storage medium of claim 9, wherein the optical flow is calculated from a secondary view to a primary view and wherein the secondary view is combined with the primary view using the optical flow.

* * * * *